United States Patent [19]

Goodman

[11] Patent Number: 4,677,367
[45] Date of Patent: Jun. 30, 1987

[54] CURRENT FED BOOST CONVERTER

[75] Inventor: George D. Goodman, Pheonixville, Pa.

[73] Assignee: General Electric Company, Binghamton, N.Y.

[21] Appl. No.: 810,462

[22] Filed: Dec. 18, 1985

[51] Int. Cl.$^4$ .............................................. G05F 1/10
[52] U.S. Cl. .................................... 323/222; 323/284
[58] Field of Search ............... 323/222, 282, 284, 285; 363/60, 73, 97, 124, 131

[56] References Cited

U.S. PATENT DOCUMENTS

| | | | |
|---|---|---|---|
| 4,155,112 | 5/1979 | Miller et al. | 323/222 |
| 4,321,526 | 3/1982 | Weischedel | 323/284 X |
| 4,542,330 | 9/1985 | Terbrack | 323/222 |

OTHER PUBLICATIONS

Redl et al., "Switching-Mode Power Converters: Optimizing Dynamic Behavior with Input and Output Feed-Forward and Current Mode Control", presented at POWERCON 7, 1980.

Primary Examiner—Patrick R. Salce
Assistant Examiner—Marc S. Hoff
Attorney, Agent, or Firm—I. David Blumenfeld

[57] ABSTRACT

A power supply comprising a high impedance source and a regulator configured as a boost type converter is disclosed. The duty cycle of a shunt switch in the regulator is controlled so as to be increased or decreased in order to respectively decrease or increase the regulator output voltage.

8 Claims, 7 Drawing Figures

CURRENT FED BOOST CONVERTER

The present invention relates in general to power supplies and more specifically to a power supply comprising a boost converter type voltage regulator and a high impedance source.

BACKGROUND OF THE INVENTION

Boost converter type voltage regulators are well known in the art. Such regulators provide an output voltage greater than or equal to the input voltage and in one form comprise an input filter capacitor, a shunt switch, an energy storage element such as an inductor in series between the switch and the regulator input, an output capacitor and control means to operate the switch to achieve a desired regulator output voltage. Typically, the switch is operated at a high rate with each closing operation serving to store energy in the inductor and each opening operation effecting a transfer of the stored energy to a load connected to the regulator output. Boost converter type regulators are normally applied to low impedance voltage sources wherein the source voltage remains substantially constant over a range of source current. As is well known, in such applications the duty cycle of the switch, i.e. the portion of time within each switching cycle that the switch is closed, is varied in direct relation to the desired change in the regulator output voltage. That is, in response to an undesirably low regulator output voltage, e.g. due to an additional load demand or a decrease in source voltage, the duty cycle is initially increased in order to increase the output voltage. Correspondingly, the response to an excessive regulator output voltage is a decrease in the duty cycle which is effective to decrease the output voltage.

Shunt type regulators are also well known in the art, differing in a number of respects from the boost converter type regulator described above. Such regulators comprise a shunt switch, an output filter section and control means to operate the switch in a manner effective to achieve a desired regulator output voltage. The switch is operated in the same frequency range as the boost converter type regulator. However, each closing operation of the switch effectively short circuits the source. Thus, such regulators are normally applied only to high impedance sources which provide only a small variation in current over a wide range of source voltage. Applied to such a high impedance source, the duty cycle of the shunt switch is adjusted to pass to the load, while the switch is open, only so much source current as is required to maintain a desired regulator output voltage. The balance of the current is shunted away on a time average basis while the switch is closed. Thus, an increase in the duty cycle has the effect of reducing the regulator output voltage since less current is passed to the load. As a result, the shunt regulator is operated with a reverse control law. That is, in order to increase the output voltage, the duty cycle is decreased to pass more current to the load. Correspondingly, the duty cycle is increased to decrease the regulator output voltage.

A major disadvantage to the use of a shunt regulator is the electromagnetic interference (EMI) its operation generates. Since each closing of the shunt switch effectively short circuits the source, the input voltage of the regulator assumes the appearance of a square wave. Such a square wave voltage generates significant EMI. The ripple present in the corresponding current flow from the source also contributes to the adverse EMI effects but to a lesser degree since the magnitude of the current variation is limited by the high source impedance. In a situation where the high impedance source is a multiple winding alternator, the generated square wave voltage may be coupled by transformer action within the alternator to other loads supplied by the alternator.

An additional disadvantage of the shunt regulator as compared to the boost converter type regulator is that the former conducts a higher magnitude of current upon each switch closure. As a result, correspondingly higher resistive losses may be experienced in the shunt regulator.

Linear series and shunt dissipative type voltage regulators, well known in the art, do not by the nature of their operation generate any EMI. Such regulators may be applied to both high and low impedance sources. However, linear dissipative regulators dissipate real power in order to provide a regulated output voltage and are therefore inefficient in operation.

A boost converter type regulator, by the nature of its operation, does not generate square wave voltages at its input and the corresponding EMI. However, such regulators, insofar as is known, have not been applied to a high impedance source and its corresponding wide open circuit voltage range. Operated in the above-described manner, the duty cycle of the shunt switch in a boost converter regulator would be increased in order to increase the regulator output voltage. However, an increase in duty cycle would effectively reduce the source voltage, due to the high source impedance, and thereby cause less power to be transferred to the load and the regulator output voltage to decrease. This is contrary to the desired result, since more rather than less power is needed in order to increase the regulator output voltage. Thus, a degenerative situation would follow wherein an increase in the duty cycle would result in a decrease in regulator output voltage, the control response to which would be a further increase in the switch duty cycle.

OBJECTS OF THE INVENTION

It is accordingly an object of the present invention to provide an improved power supply utilizing a boost converter regulator in conjunction with a high impedance source.

A further object of the present invention is to provide an improved regulated power supply for use with a high impedance source in which the generation of electromagnetic interference is minimized.

Another object of the present invention is to provide a regulated power supply that operates efficiently.

An additional object of the present invention is to provide a regulated power supply that can be used with an alternator as its source without generating undesirable EMI in the windings thereof.

A further object of the present invention is to provide a regulated power supply of the above-character which is highly efficient and reliable in operation.

Yet another object of the present invention is to provide a regulated power supply suitable for use with a high impedance source characterized by a wide, open circuit voltage range.

SUMMARY OF THE INVENTION

These and other objects are accomplished by the present invention which is directed to a DC power supply comprising a high impedance source and a boost converter regulator. The regulator includes an energy storage inductor connected in series between input and output regulator terminals with shunt switching means connected between the output end of the inductive means and a circuit reference voltage point. Separate capacitive filters are respectively connected between the regulator input and output terminals and the common reference voltage point. A control circuit conditions the switching means to open and close with the duty cycle determined as a function of the difference between the voltage at the output terminal and a desired regulated voltage; the duty cycle being respectively increased or decreased to correct for the output terminal voltage increasing above or falling below the desired voltage.

DESCRIPTION OF THE INVENTIONS

Figure 1:
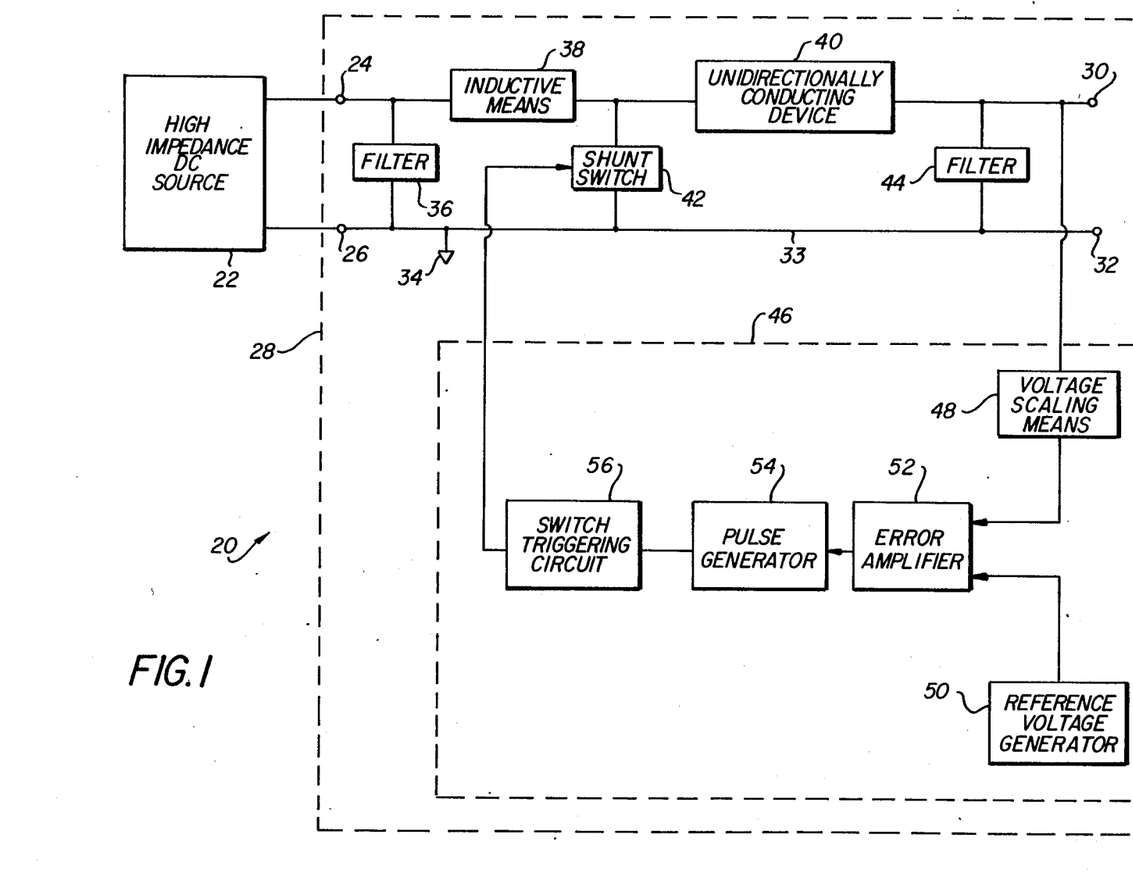
FIG. 1 is a basic block diagram of a regulated power supply constructed in accordance with the present invention.

Referring to FIG. 1, a power supply generally indicated at 20, includes a high impedance DC source 22 connected to input terminals 24 and 26 of voltage regulator circuit 28 having output terminals 30 and 32. A bus 33 connects terminals 26 and 32 in common to a circuit common reference voltage point 34. A filter 36 is connected across the input terminals, while energy storage inductive means 38 is connected in series with a unidirectionally conducting device 40 between input terminal 24 and output terminal 30. A shunt switch 42 is connected between the junction of inductive means 38 and unidirectionally conducting device 40 and bus 33. A second filter 44 is connected across the output terminals.

Regulator 28 further comprises a control circuit 46 including voltage scaling means 48, for providing a signal voltage proportional to the regulator output voltage appearing at terminal 30 with respect to terminal 32. The output of a reference voltage generator 50 and that of scaling means 48 are applied to an error amplifier 52. The error amplifier output is coupled to a pulse generator 54 whose output is applied to a switch triggering circuit 56 operating to control opening and closing of switching means 42.

Figure 2:
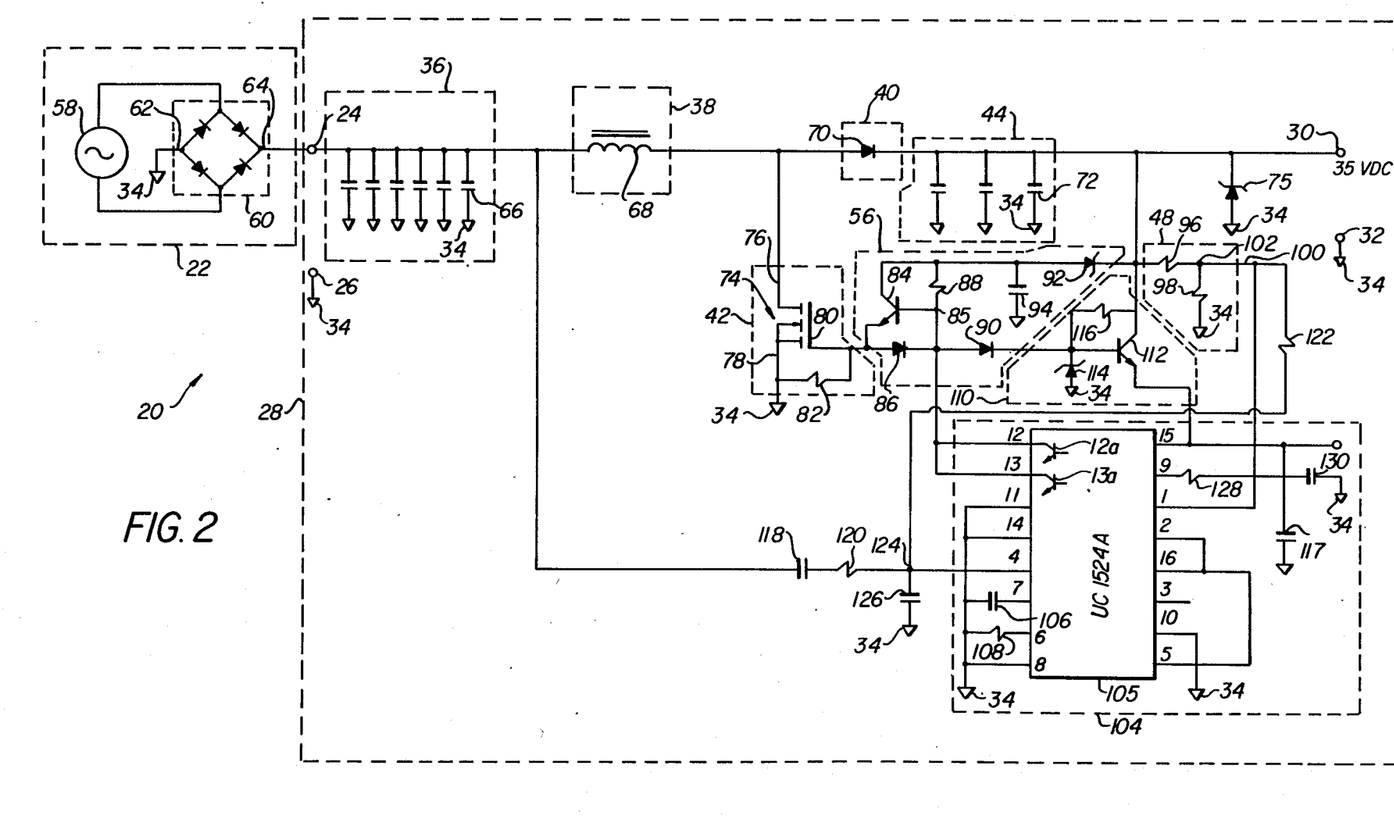
FIG. 2 is a detailed schematic diagram of a preferred embodiment of the power supply of FIG. 1.

As seen in FIG. 2, source 22 comprises a high impedance alternator 58 coupled to a full wave bridge rectifier 60. A rectifier output return 62 is connected to circuit common reference voltage point 34, while a second rectifier output 64 is connected to regulator input terminal 24. Filter 36 comprises a bank of filter capacitors 66 parallel connected between input terminal 24 and reference point 34. Inductive means 38 comprises an inductor 68 connected to input terminal 24, and device 40 comprises a diode 70 with its anode and cathode respectively connected between inductor 68 and output terminal 30. Filter 44 comprises a bank of filter capacitors 72 parallel connected between output terminal 30 and reference point 34. Shunt switch 42 consists of an N-channel power MOSFET 74 having its drain 76 connected to the junction between inductor 68 and diode 70, and its source 78 connected to reference point 34. A resistor 82 is connected between source 78 and a gate 80 of MOSFET 74. A zener diode 75 is connected between output terminal 30 and reference point 34 solely to protect the load against any substantial overvoltage resulting from a regulator circuit failure.

Switch triggering circuit 56 comprises an NPN transistor 84 having a base terminal 85 and an emitter coupled to MOSFET gate 80. A diode 86 is connected across the base-emitter junction of transistor 84 with its anode connected to the emitter. A resistor 88 is connected across the base-collector junction of the transistor. Circuit 56 further includes a diode 90 with its anode connected to the base of transistor 84 as well as a zener diode 92 having an anode connected to the collector of transistor 84 and a cathode connected to output terminal 30. A capacitor 94 is connected between the anode of diode 92 and circuit reference point 34.

Scaling means 48 is provided as a voltage divider comprising resistors 96 and 98 connected in series between output terminal 30 and circuit reference point 34. An output 100 of the divider is connected to a node 102 joining resistors 96 and 98 so that the signal voltage proportional to the regulator output voltage appears on the divider output.

In the preferred embodiment of the present invention, a regulating pulse width modulator circuit 104 includes a regulating pulse width modulator integrated circuit chip 105 for the generation of pulses to be applied to triggering circuit 56. One such integrated circuit is manufactured by Unitrode as model UC1524A and the circuit connections thereto are illustrated in FIG. 2. Regulating modulator chip 105 includes the reference voltage generator 50 and error amplifier 52 illustrated in FIG. 1. The internally generated reference voltage appears at a chip terminal 16. The error amplifier noninverting and inverting inputs are respectively designated as chip terminals 2 and 1. The signal voltage provided by the voltage divider is applied to terminal 1 by connecting it to divider output 100. Terminal 2 is connected to terminal 16 of the regulating modulator chip in order that the reference voltage may be applied thereto. Terminals 12 and 13 of modulator chip 105 are connected together and to base terminal 85 of transistor 84 in trigger circuit 56. Terminals 12 and 13 are respectively connected, within modulator chip 105, to the open collectors of output transistors 12a and 13a. Each terminal 12 and 13 may assume either a "high" or "low" state. Assuming first that terminals 12 and 13 are disconnected from each other and base terminal 85, when either output transistor 12a or 13a is "off" (i.e nonconducting), the terminal connected thereto floats in a "high" state. When either of these transistor is "on" (i.e. conducting), its output terminal is effectively connected to reference point 34 and is thus in the "low" state. However, terminals 12 and 13 are connected together as well as to base terminal 85 and this connection results in the individual output states on the terminals being subject to a NOR logic function. That is, when either terminal is in the "low" state, or when both terminals are "low", the point of connection between terminals 12 and 13, and hence base terminal 85 of transistor 84, is in the "low" state. Only when both terminals 12 and 13 are in the "high" state can base terminal 85 be pulled to the "high" state by resistor 88.

A capacitor 106 and a resistor 108 are respectively connected from modulator terminals 7 and 6 to reference voltage point 34. The capacitance and resistance values selected for capacitor 106 and resistor 108 determine the frequency of the switching between states occurring on terminals 12 and 13. In the preferred embodiment of the present invention, the capacitance and resistance values indicated hereinafter result in a characteristic switching frequency for modulator 104 of approximately 107 kHz.

Circuit 20 further includes a housekeeping power circuit 110 for providing a stable power supply for modulator chip 105. Circuit 110 is configured as a simple linear power supply comprising an NPN transistor 112 with a zener diode 114 connected between the base of transistor 112 and reference point 34. The collector of transistor 112 is connected to regulator output terminal 30, while its emitter terminal is connected to a terminal 15 of the modulator chip. A filter decoupling capacitor 117 is connected between terminal 15 and reference point 34. A bias resistor 116 is connected across the base-collector junction of transistor 112. A resistor 128 and a capacitor 130 are respectively series connected between chip terminal 9 and reference point 34 as a frequency compensating network to enhance control loop stability.

A start-up portion of regulator 28 includes a differentiating network consisting of a capacitor 118 and a resistor 120 connected in series between terminal 4 of modulator chip 105 and a point between capacitors 66 and inductor 68. The start-up portion further includes a resistor 122, included in the series connection of divider output 100 to modulator terminal 4, which is coupled to reference point 34 by a capacitor 126. Additionally, the reference voltage at terminal 16 of the modulator chip is applied to a terminal 5.

In operation, alternator 58 generates AC voltage and current which is rectified by rectifier 60. The rectified DC voltage appears at rectifier output terminals 64 and 62 and is applied across terminals 24 and 26 of regulator 28. Filter capacitors 66 are effective to smooth the ripple in the rectified current and voltage. During start-up of power supply 20 while the alternator current and corresponding voltage are initially being increased, substantially no regulator operation occurs so long as the current delivered to terminal 24 is lower in magnitude than that required to result in the desired regulated output voltage. Thus, at this point in the operation of supply 20, the duty cycle of shunt switch 42 (i.e. the portion of time the switch is closed within each switching cycle) is at a minimum of nearly 0% and, as a result, substantially the same voltage appears at the regulator input and output terminals. As the current delivered to terminal 24 further increases, it exceeds the value required to generate the desired output voltage. As a result, the regulator output voltage exceeds the desired output voltage and control circuit 46 responds by increasing the duty cycle of shunt switch 42. Thus, in response to an excessive regulator output voltage, the control circuit increases the shunt switch duty cycle in order to decrease the output voltage magnitude to that of the desired voltage, thereby following a reverse control law. With each closing of the shunt switch, energy is stored in inductor 68 in typical boost converter regulator fashion. Further, with each opening of the shunt switch, the energy stored in the inductor while the switch was closed is transferred to output filter capacitors 72 and a load (not shown) connected across the regulator output terminals.

A power section of regulator 28 comprising filter capacitors 66 and 72, diode 70, inductor 68 and MOSFET 74 is configured as a typical boost converter. It is assumed for the purpose of explaining the operation of the present invention that the operation of the above-described power section is lossless. This is a reasonable assumption since, as is well known in the art, switching type regulators primarily comprise reactive and switching components which are characteristically highly efficient in operation.

Given the assumption that the operation of the power section is lossless, it follows that during steady state operation, the power $P_{in}$ delivered to the regulator from source 22 is equal to the power $P_{out}$ delivered by the regulator to the load connected to the regulator output. This relationship is described in equation (1):

$$P_{in} = P_{out} \qquad (1)$$

$P_{in}$ can be expressed as the product of the DC source voltage $V_{in}$ applied to the regulator and the source current $I_{in}$. Similarly, $P_{out}$ can be expressed as the product of the regulator DC output voltage $V_{out}$ and the current $I_{out}$ delivered by the regulator to the load. Thus, during steady state operation, regulator operation is described by equation (2):

$$V_{in} \times I_{in} = V_{out} \times I_{out} \qquad (2)$$

During the steady state operation of regulator 28, the current $I_{in}$ delivered to the regulator by the source is a DC current, filtered by capacitors 66, and is equal to the average current flowing in inductor 68. The current $I_{out}$ delivered by regulator 28 to the load is equal to the average current flowing in diode 70 and has a magnitude that varies in inverse proportion to the switch duty cycle. Thus as the duty cycle is decreased or increased, respectively more or less current $I_{out}$ is delivered through diode 70 to the load, the balance of $I_{in}$ being shunted. Correspondingly, respectively more or less power $P_{out}$ is delivered to the load. Filter capacitors 72 are effective to smooth the ripple in the current delivered to the load.

During steady state operation, regulator 28 maintains $V_{out}$ equal to the desired output voltage. Therefore as the power requirement of the load increases or decreases, while $I_{in}$ remains constant, $I_{out}$ must be respectively increased or decreased. Regulator 28 accomplishes this by controlling the duty cycle and thus the magnitude of $I_{out}$ in the manner described above. Another operating situation is encountered where $I_{in}$ increases or decreases to a new value due to changes occurring in the source, e.g. a speed change in alternator 58, while the power $P_{out}$ required by the load remains constant. In this situation, to maintain $V_{out}$ equal to the desired output voltage, $I_{out}$ must remain constant in order to maintain a constant $P_{out}$. Regulator 28 holds $I_{out}$ constant by increasing or decreasing the switch duty cycle where $I_{in}$ respectively increased or decreased to a new value.

While the above-described relationship between $I_{out}$ and the switch duty cycle is typical of that found in a shunt regulator, the power section of regulator 28 is configured as a boost converter. As a result, $V_{in}$ is less than or equal to $V_{out}$. Where the power requirement of the load increases or decreases while $I_{in}$ remains constant, equation (2) can be rearranged and written as equation (3):

$$V_{in} = I_{out} \times K_1 \qquad (3)$$

where $K_1$ is a constant equal to $V_{out}/I_{in}$ since both $V_{out}$ and $I_{in}$ are constant. Then the regulator operation is effective to vary the duty cycle in the manner described above to adjust $I_{out}$ in order to meet the variation in the load power requirement. As seen in equation (3), $V_{in}$ varies in direct relationship with the variation in $I_{out}$ resulting from the variation in duty cycle. With $I_{in}$ constant, it is seen that the variation in $V_{in}$ results in a variation in $P_{in}$ so that $P_{in} = P_{out}$.

In the operating situation, discussed above, where $I_{in}$ increases or decreases while $P_{out}$ remains constant, equation (2) can be rewritten as equation (4):

$$V_{in} = K_2/I_{in} \qquad (4)$$

where $K_2$ is a constant equal to $V_{out} \times I_{out}$ since $V_{out}$ is regulated to be constant and $P_{out}$ (and hence $I_{out}$) is assumed constant in this situation. Regulator 28 varies the duty cycle in the manner previously described in response to the change in $I_{in}$. As a result of the duty cycle variation and as seen in equation (4), $V_{in}$ varies in inverse relation with $I_{in}$ in order to maintain $P_{in} = P_{out}$.

Thus in general the operation of regulator 28 is effective to vary the source voltage $V_{in}$ in order to control $P_{in}$. As the switch duty cycle increases or decreases, $V_{in}$ respectively decreases or increases. This situation is contrasted with that found in a typical boost converter operating from a low impedance voltage source. In the latter situation, regulator operation is effective to vary the source current $I_{in}$ to control $P_{in}$.

Figure 3:
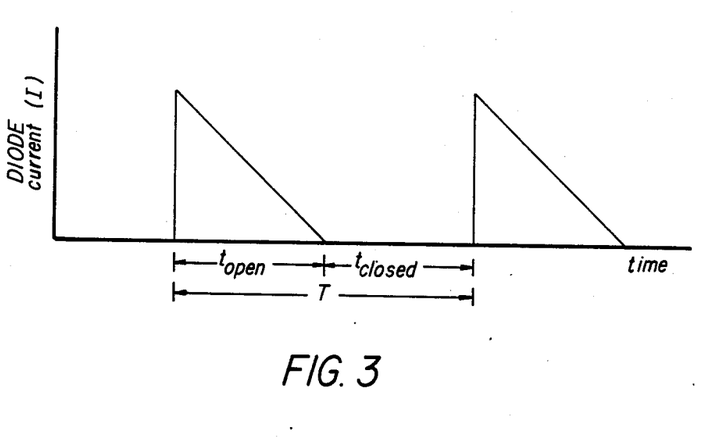
FIG. 3 is a graph of a current waveform illustrating the operation of the power supply of FIG. 2.

The inductance value of inductor 68 is selected to limit the amount of energy stored therein during the switch closed portion of the switching cycle such that all of its stored energy is transferred to the load during the switch open portion of the cycle. Such operation is commonly known as a discontinuous mode of operation and is the mode practiced in the preferred embodiment of the present invention. The waveform of current flowing in diode 70 during the discontinuous mode of operation is illustrated in FIG. 3 with $T_{open}$ and $T_{closed}$ respectively indicating the portions of the switching cycle when the shunt switch is open and closed. The period of the switching cycle is indicated as T. During the switch closed portion of the switching cycle, current is supplied to the load from output capacitors 72 which also serve to maintain the regulated output voltage level. Diode 70 prevents discharge of capacitors 72 through the shunt switch.

Considering the operation of modulator 104 in more detail, the reference voltage generated on terminal 16 is assumed to be 5 volts and is applied to terminal 2 of the error amplifier. The resistance values of resistors 96 and 98 are selected so that the signal voltage appearing on divider output 100 is 5 volts when the regulator output voltage across terminals 30, 32 is equal to the desired regulated output voltage. Since divider output 100 is connected to terminal 1 of modulator chip 105, the error amplifier incorporated therein sees the signal voltage and the reference voltage. The error amplifier can thus provide a differential analog output signal which is applied to circuitry within the modulator for controlling the respective durations of the previously described "high" and "low" states on terminals 12 and 13.

Figure 4A:
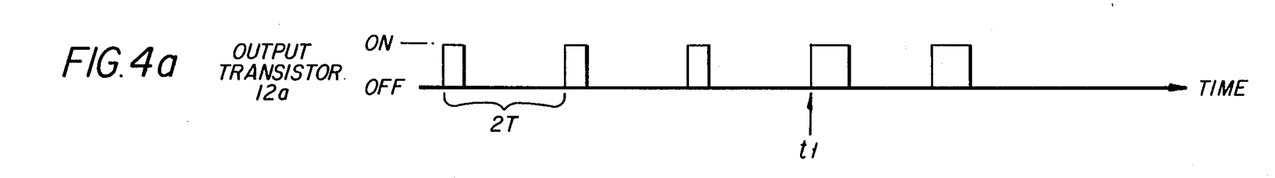
FIGS. 4a, 4b, 4c, and 4d are pulse timing diagrams illustrating the operation of the power supply of FIG. 2.
Figure 4B:
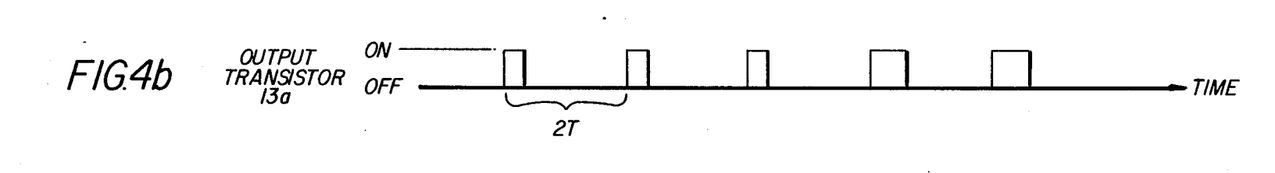

FIGS. 4a and 4b respectively illustrate the on-off cycling of the output transistors 12a and 13a of the modulator in the absence of the connection between terminals 12 and 13. Each of the output transistors cycles on-off at a frequency having a cycle period designated 2T, T being the period of the characteristic frequency of modulator 104. The respective cycle periods of the two transistors are phased 180° apart.

Figure 4C:
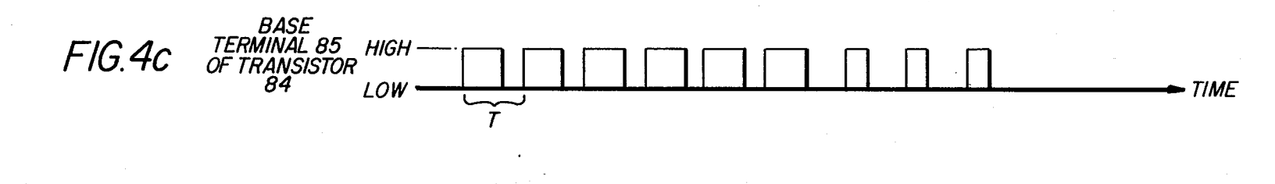
Figure 4D:
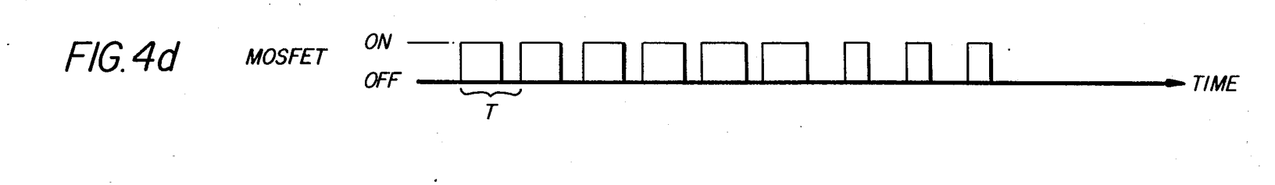

As previously described, terminals 12 and 13 are connected to base 85 of transistor 84 which is in turn coupled to regulator output terminal 30 through resistor 88 and diode 92. As a result, the "high" and "low" states assumed by these terminals are effective to control the conductivity of transistor 84 and diode 86. As seen in FIG. 4, when either or both output transistors 12a and 13a are "on", terminals 12, 13 and base 85 are pulled down to the "low" state of reference voltage point 34, and transistor 84 is turned "off". When both transistors 12a and 13a are "off", terminals 12, 13 and base 85 are pulled up to a "high" state referenced to the regulator circuit output voltage through resistor 88, and transistor 84 is turned "on". As seen in FIG. 4c, this results in "high"-"low" state cycling pulses being applied to base 85 of transistor 84 to switch the transistor "on" and "off" at a switching frequency with the period T. When transistor 84 is "on", gate 80 of MOSFET 74 is pulled up to the voltage at the anode of zener diode 92. As a result, the capacitance of gate 80 charges and the MOSFET turns "on" (switch closes) to connect the output end of inductor 68 to reference voltage point 34. When transistor 84 is "off", the regulator output voltage is no longer applied to gate 80. As a result, the gate capacitance discharges through diode 86 to reference point 34 via terminals 12 and/or 13, and the MOSFET turns "off" (switch opens). Thus, as seen in FIG. 4d, the "on"-"off" switch cycling of the MOSFET follows the cycling at base 85 of transistor 84. Resistor 82 is a leak resistor providing for full turn-off of the MOSFET. Diode 92 is rated to remain nonconductive, and hence effectively blocks MOSFET operation, until a predetermined regulator output voltage sufficient to enable the proper operation of modulator chip 105 via power circuit 110 is achieved.

The error amplifier in modulator chip 105 operates to correct a signal voltage that is high or low relative to the reference voltage by respectively increasing or decreasing the "on" times of transistors 12a and 13a, by substantially the same amount, within the cycle period 2T for each transistor. The effect of an increase or decrease in the "on" time by an incremental amount relative to the "off" time within the cycle period 2T of each transistor 12a and 13a is to respectively decrease or increase the duration of the high state at base 85, and hence the "on" time of the MOSFET, by the same incremental amount within cycle period T. In this manner, the previously described reverse control law is implemented. This effect is illustrated in FIG. 4 where after time t1, the respective "on" times of transistors 12a and 13a, as seen in FIGS. 4a and 4b, are increased. Since the respective on-off cycles of transistors 12a and 13a are 180° out of phase with one another, the result of the increase in their "on" times is a corresponding decrease in the duration of the "high" state at base 85 of transistor 84 (FIG. 4c).

As previously discussed, the regulator output voltage is greater than or equal to the source voltage since the power section of the regulator of the present invention is configured as a boost converter type regulator. In the preferred embodiment of the present invention wherein the desired regulator output voltage is substantially 35 V, it is anticipated that during normal operation the source output voltage may be maintained in the range of 10 to 30 V by variation of the switch duty cycle. As previously discussed, during normal operation of the power supply, the source voltage is maintained at a value less than the regulator output voltage. However, as noted above, during start up, regulator operation does not commence until both the source and output reach an initial voltage exceeding the desired voltage e.g. 35 V in the preferred embodiment. At this time, capacitors 66 are charged to this initial voltage which is significantly higher than the voltage occurring during normal operation, i.e. 10 to 30 V. Thus, an excessive amount of energy is stored in capacitors 66. When shunt switch operation commences in response to the start up voltage exceeding the desired regulated voltage, the excess energy stored in capacitors 66 prevents the source output voltage from immediately decreasing. Instead, switch operation at start-up effects a transfer of the energy stored in capacitors 66, as well as energy from the source, at an undesirably high initial voltage, to output capacitors 72 and the connected load. Thus an excess amount of energy is also stored in capacitors 72. This has a transient effect of increasing the output voltage, rather than decreasing it, and, in response, the control circuit further increase the switch duty cycle. In the preferred embodiment of the present invention, the maximum switch duty cycle that may be initiated under control of the error amplifier output signal is approximately 90-95%. At this high duty cycle, the excess energy in capacitors 66 would be depleted in a period of time on the order of milliseconds and normal regulator operation would proceed. However, during this depletion period, an undesirable output overvoltage, i.e greater than the desired output voltage, will have occurred.

To compensate for this situation, the start-up portion of circuit 20 is provided to minimize the magnitude of this temporary output overvoltage condition. To this end, a circuit intended to be used as a current limit amplifier, within the integrated circuit modulator chip 105, has its noninverting and inverting inputs brought out to terminals 5 and 4, respectively. When the divider signal voltage applied to terminal 4 exceeds the reference voltage applied to terminal 5 by a threshold differential of approximately 0.2 V, the current limit amplifier output goes "low". The amplifier output "low" state overrides the error amplifier output signal and switch 42 is forced to a sustained closed position independent of the duty cycle that would otherwise result from the error amplifier output signal. Consequently, source 22 and capacitors 66 are disconnected from the regulator output, during which time the excess energy in capacitors 66 is discharged through the switch, and the excess charge on capacitors 72 is dissipated by the load.

Output 100 of the voltage divider comprising resistors 96 and 98 is coupled to chip terminal 4 so that the voltage applied to the current limit amplifier inverting input is equal to the signal voltage received by the error amplifier. As a result, capacitor 126 at chip terminal 4 charges to the signal voltage level representative of the regulator output voltage for comparison by the current limit amplifier with the reference voltage applied to terminal 5 from terminal 16. Upon occurrence of an output overvoltage condition wherein the signal voltage exceeds the reference voltage by the 0.2 volt threshold differential, the current limit amplifier overrides the error amplifier output signal and forces the switch duty cycle to 100%. Consequently, the regulator output voltage decays as the load is supplied from the discharging capacitors 72. However, the voltage on capacitors 66 decays at a faster rate as the capacitors discharge to circuit reference voltage point 34 through the inductor and switch. The magnitude of the discharge current from capacitors 66 ramps up due to the effect of inductor 68 and, as a result, the voltage on these capacitors and across the regulator input terminals decreases at an accelerating rate. Chip terminal 4 is seen to be coupled to the regulator input through the differentiating network consisting of capacitor 118 and resistor 120. As a result, current flows in resistor 120 in proportion to the rate of change of the voltage on capacitors 66, which is in turn proportional to the current flowing into or out of the capacitors. Since the capacitors are discharging, the current in resistor 120 flows toward capacitor 66 and is therefore effective to discharge capacitor 126. Resistor 122 impedes the contribution of current from the regulator output to the current flowing in resistor 120 so that capacitor 126 can be effectively discharged. The discharge of capacitor 126 causes a reduction of the voltage on the inverting input of the current limit amplifier. When the voltage at the inverting input no longer exceeds the voltage on terminal 5 by 0.2 V, the amplifier output goes "high", thereby returning control of the switch duty cycle to the error amplifier output signal. Thus the rate by which capacitors 66 are discharged is limited by monitoring the rate of change of regulator input voltage. Additionally the regulator output voltage is limited to a maximum value corresponding to a signal voltage having a magnitude of approximately 5.2 V (a signal voltage of 5 V corresponding to the desired output voltage +0.2 V threshold differential). The discharge of capacitors 66 by the start-up circuit portion is repeated until the charge on the capacitors is reduced to a value enabling normal regulator operation.

The embodiment of the invention illustrated in FIG. 2 may be constructed with the following component:

| | |
|---|---|
| Rectifier 60 | Unitrode 802-2 |
| Capacitors 66 | 22 μfds. each |
| Capacitors 72 | 86 μfds. each |
| Capacitor 94 | 0.1 μfd. |
| Capacitor 106 | 0.001 μfd. |
| Capacitor 117 | 0.1 μfd. |
| Capacitor 118 | 0.033 μfd. |
| Capacitor 126 | 0.1 μfd. |
| Capacitor 130 | 15 μfds. |
| Inductor 68 | 6.8 μhs. |
| Diode 70 | 1N5314. |
| Diode 86 | 1N5802. |
| Diode 90 | 1N4148. |
| Zener diode 75 | 1N5556. |
| Zener diode 92 | 1N970B-1. |
| Zener diode 114 | 1N962B-1. |
| Transistor 84 | 2N2222A. |
| Transistor 112 | 2N5000. |
| Resistor 82 | 10,000 ohms. |
| Resistor 88 | 1,500 ohms. |
| Resistor 96 | 6,040 ohms. |
| Resistor 98 | 1,000 ohms. |
| Resistor 108 | 10,700 ohms. |
| Resistor 116 | 10,000 ohms. |
| Resistor 120 | 40,200 ohms. |
| Resistor 122 | 1,000 ohms. |
| Resistor 128 | 681 ohms. |

| | |
|---|---|
| -continued | |
| MOSFET 80 | 2N6764. |

While the power supply disclosed herein comprises an alternator as the high impedance source, the invention is not so limited. The invention may be practiced with other types of high impedance power sources as well as current limited voltage sources. For example, solar cells operate as a high impedance source suitable for use in the present invention. Further, it will be recognized by those skilled in the art that the high impedance source of the present invention comprehends any source within a range of high source impedance. Thus, the invention may be practiced with any such high impedance source including those wherein the source current varies significantly with the source voltage.

The preferred embodiment of the present invention is disclosed herein as including a regulating modulator in integrated circuit form, but it will be understood that means for the generation of a pulse train having a pulse width magnitude controlled by an error signal may be constructed from discrete components by techniques well known in the art. For example, the output of a comparator may be controlled to produce a pulse train by applying to its respective inputs an error signal and a sawtooth waveform. While the preferred embodiment of the present invention is disclosed herein using a Unitrode type UC1524A integrated circuit chip, other chips are available, from other manufacturers, which perform substantially the same function.

A discontinuous mode of operation is disclosed herein. However, by increasing the inductance value of inductance means 38, increasing the switching frequency of the switching means, or both, a continuous current mode of operation may be practiced. In such an operating mode, as is well known, the energy in the inductor is not fully depleted during the open portion of each switching cycle. In order to practice a continuous mode of operation, however, control circuit modifications are required to ensure stable operation. While the control circuit disclosed herein accomplishes varying of the switch duty cycle by adjusting the pulse width within each switching cycle of a constant frequency pulse train, the invention is not so limited. As is well known in the art, the switch duty cycle may be varied by maintaining the pulse width in proportion to the length of each switching cycle and varying the cycle frequency and hence the period.

While the operation of transistor 84 in triggering circuit 56 is controlled by the operation of both transistors 12a and 13a in modulator chip 105, the invention is not so limited. Transistor 84 can be operated by connecting base terminal 85 to only terminal 12 or 13 rather than to both terminals. For example, if only connected to terminal 12, the "on" and "off" states of transistor 12a would respectively initiate "off" and "on" states in transistor 84 (and hence in the MOSFET). Since the switching frequency of each transistor 12a or 13a is one-half the characteristic frequency of modulator chip 105, the characteristic frequency may require adjustment, by selecting suitable values for capacitor 106 and resistor 108, to achieve a desired MOSFET switching frequency. Due to the design of chip 105, a maximum duty cycle of 50% is achieved when the trigger circuit is connected only to terminal 12 or 13. Thus it would be necessary to assess the requirements of the application before so connecting the trigger circuit.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A power supply circuit for providing a regulated direct current output voltage, comprising:
   a high impedance DC source; and
   a regulator including:
      an input terminal coupled to said DC source and an output terminal;
      energy storage means including an inductor, said inductor having a first end connected in circuit with said input terminal and a second end connected in circuit with said output terminal;
      switching means connected between said second end of said inductive means and a circuit reference voltage point;
      a unidirectionally conducting device connected between said second end of said inductor and said output terminal; and
      a control circuit coupled between said output terminal and said switching means for conditioning said switching means to open and close with a duty cycle determined as a function of the difference between an output voltage appearing at said output terminal and a desired voltage, including means for producing triggering voltages for said switching means to cause said switching means to follow a reverse control law whereby said duty cycle is increased to reduce the output whenever it rises above said desired voltage and said duty cycle is decreased to increase the output voltage when said output voltage falls below said desired voltage; said output voltage being greater than or equal to said source voltage.

2. The power supply circuit of claim 1 wherein said energy storage means further includes first capacitive means connected between said input terminal and said reference voltage point.

3. The power supply circuit of claim 2, wherein said energy storage means further includes second capacitive means connected between said output terminal and said reference voltage point.

4. The power supply circuit of claim 1 wherein said control circuit includes:
   voltage scaling means connected to said output terminal for providing a signal voltage proportional to said output voltage;
   means for generating a reference voltage representative of said desired voltage;
   means coupled to said voltage scaling means and said reference voltage generating means for generating an error signal representative of the difference between said signal voltage and said reference voltage; and
   a switch triggering circuit coupled to said switching means, said triggering circuit being conditioned by said error signal to open and close said switching means.

5. The power supply circuit of claim 4, wherein said switch triggering circuit includes a transistor connected to receive supply voltage from said output terminal, said power supply circuit further including a zener diode connected to block the receipt of said supply voltage by said transistor until the voltage on said output terminal rises to a predetermined value.

6. The power supply circuit of claim 4, wherein said error signal generating means comprises an error amplifier;

said control circuit comprising pulse width modulating means for generating a switching signal in the form of a pulse train wherein the duration of each pulse thereof is controlled by said error signal, said modulating means being coupled to said triggering circuit for application of said switching signal thereto;

said energy storage means further includes first capacitive means connected between said input terminal and said reference voltage point; and said control circuit further including means for overriding said error amplifier to cause a sustained closure of said switching means, said overriding means being responsive to an accumulation of excessive charge on said first capacitive means; whereby the operation of said overriding means is effective to discharge the excessive charge on said first capacitive means.

7. The power supply circuit of claim 6 wherein said charge on said first capacitive means results in an undesirable output overvoltage exceeding said desired voltage by a predetermined amount;

said overriding means comprising:

voltage comparing means having a first input coupled to said reference voltage generating means, a second input and an output;

said voltage scaling means coupled to said second input of said voltage comparing means to apply said signal voltage thereto as a first signal voltage;

second capacitive means connected between said voltage comparing means second input and said circuit reference voltage point;

differentiating means coupled between said regulator input terminal and said voltage comparing means second input, said differentiating means having a current flowing therein proportional to the rate of change of the voltage on said input terminal;

said output of said voltage comparing means coupled to said switch triggering circuit;

said voltage comparing means generating an override signal upon the occurrence of said undesirable overvoltage effective to condition said triggering circuit to effect said sustained closure of said switching means;

whereby during the discharge of said excessive charge on said first capacitive means the voltage on said input terminal decreases, the current flowing in said differentiating means being effective to discharge said second capacitive means thereby effecting the termination of said override signal when the rate of decrease of the voltage on said input terminal reaches a predetermined value.

8. The regulator circuit of claim 1 wherein said inductive means has a limited capacity such that while said switching means is open, all of the energy stored in said inductive means is transferred to said output.

* * * * *